(12) United States Patent
Venugopal et al.

(10) Patent No.: US 11,696,234 B2
(45) Date of Patent: Jul. 4, 2023

(54) TECHNIQUES FOR DYNAMIC CONFIGURATION OF CHANNEL STATE INFORMATION PROCESSING UNITS

(71) Applicant: QUALCOMM Incorporated, San Diego, CA (US)

(72) Inventors: Kiran Venugopal, Raritan, NJ (US); Junyi Li, Chester, NJ (US); Yan Zhou, San Diego, CA (US); Tianyang Bai, Bridgewater, NJ (US); Jung Ho Ryu, Fort Lee, NJ (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 27 days.

(21) Appl. No.: 17/095,254

(22) Filed: Nov. 11, 2020

(65) Prior Publication Data

US 2021/0153129 A1 May 20, 2021

Related U.S. Application Data

(60) Provisional application No. 62/936,116, filed on Nov. 15, 2019.

(51) Int. Cl.
*H04W 52/02* (2009.01)
*H04W 80/02* (2009.01)
*H04B 7/06* (2006.01)

(52) U.S. Cl.
CPC ...... *H04W 52/0251* (2013.01); *H04B 7/0626* (2013.01); *H04W 52/0277* (2013.01); *H04W 80/02* (2013.01)

(58) Field of Classification Search
CPC ... H04B 7/0626; H04L 5/0007; H04L 5/0057; H04W 24/02; H04W 24/10; H04W 52/0251; H04W 52/0277; Y02D 30/70
See application file for complete search history.

(56) References Cited

U.S. PATENT DOCUMENTS

| | | | |
|---|---|---|---|
| 2017/0290053 A1 | 10/2017 | Hwang et al. | |
| 2019/0159219 A1 | 5/2019 | Hosseini et al. | |
| 2019/0222282 A1* | 7/2019 | Tsai | H04W 24/10 |
| 2020/0196179 A1* | 6/2020 | Kim | H04B 17/309 |
| 2020/0229096 A1* | 7/2020 | Atefi | H04W 28/02 |
| 2020/0350968 A1* | 11/2020 | Tsai | H04L 1/0023 |
| 2021/0120489 A1* | 4/2021 | Jiang | H04W 52/0216 |

OTHER PUBLICATIONS

International Search Report and Written Opinion—PCT/US2020/060171—ISA/EPO—dated Feb. 22, 2021.

* cited by examiner

*Primary Examiner* — Pao Sinkantarakorn
(74) *Attorney, Agent, or Firm* — Arent Fox, LLP

(57) ABSTRACT

Techniques for dynamic configuration of channel state information (CSI) processing units are disclosed. In an example, a user equipment (UE) may determine an operational state of the UE. The UE may also identify a number of channel state information (CSI) processing units that are supported by the UE for calculating and reporting one or more CSI reports based on the operational state of the UE. The UE may also transmit, to a base station, a notification indicating the number of CSI processing units.

26 Claims, 5 Drawing Sheets

TECHNIQUES FOR DYNAMIC CONFIGURATION OF CHANNEL STATE INFORMATION PROCESSING UNITS

CROSS-REFERENCE TO RELATED APPLICATION(S)

This application claims the benefit of U.S. Provisional Application Ser. No. 62/936,116, entitled "TECHNIQUES FOR DYNAMIC CONFIGURATION OF CHANNEL STATE INFORMATION PROCESSING UNITS" and filed on Nov. 15, 2019, which is expressly incorporated by reference herein in its entirety.

BACKGROUND

Aspects of the present disclosure relate generally to communication systems, and more particularly, to techniques for dynamic configuration of channel state information (CSI) processing units.

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is fifth generation (5G) new radio (NR) technologies. 5G NR technologies are a part of a continuous mobile broadband evolution promulgated by Third Generation Partnership Project (3GPP) to meet new requirements associated with latency, reliability, security, scalability (e.g., with Internet of Things (IoT)), and other requirements. 5G NR technologies include services associated with enhanced mobile broadband (eMBB), massive machine type communications (mMTC), and ultra reliable low latency communications (URLLC). Some aspects of 5G NR technologies may be based on the fourth generation (4G) Long Term Evolution (LTE) standard.

In some cases, a base station may request that a user equipment (UE) send one or more CSI reports to the base station. The CSI reports may provide the base station with one or more channel qualities or measurements performed by the UE. Depending on channel qualities or measurements to be reported in the CSI reports, a different number of CSI processing units for processing CSI reports may be needed across different cells. Typically, the CSI reports are associated with a maximum number of CSI processing units for CSI calculations. However, in some situations, such as when a UE is low on power, the UE may not want to use all of the CSI processing units indicated in the maximum number of CSI processing units to compute and report CSI reports. Accordingly, there exists a need for further improvements in 5G NR technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect, a method of wireless communication by a user equipment (UE) is disclosed. The method may include determining an operational state of the UE. The method may also include identifying a number of channel state information (CSI) processing units that are supported by the UE for calculating and reporting one or more CSI reports based on the operational state of the UE. The method may also include transmitting, to a base station, a notification indicating the number of CSI processing units.

In another aspect, a method of wireless communication by a base station is disclosed. The method may include verifying a value indicating a first number of CSI processing units of a UE for calculating and reporting one or more CSI reports. The method may also include determining communication constraints between the base station and the UE. The method may also include determining a second number of CSI processing units for the UE to use for calculating and reporting the one or more CSI reports based on one or more of the value or the communication constraints. The method may also include transmitting a notification of the second number of CSI processing units to the UE.

In another aspect a UE is presented. The UE may include a memory storing instructions and one or more processors communicatively coupled with the memory. The one or more processors may be configured to identify a number of CSI processing units that are supported by the UE for calculating and reporting one or more CSI reports based on the operational state of the UE. The one or more processors may be configured to transmit, to a base station, a notification indicating the number of CSI processing units.

In another aspect, a base station is presented. The base station may include a memory storing instructions and one or more processors communicatively coupled with the memory. The one or more processors may be configured to verify a value indicating a first number of CSI processing units of a UE for calculating and reporting one or more CSI reports. The one or more processors may be configured to determine communication constraints between the base station and the UE. The one or more processors may be configured to determine a second number of CSI processing units for the UE to use for calculating and reporting the one or more CSI reports based on one or more of the value or the communication constraints. The one or more processors may be configured to transmit a notification of the second number of CSI processing units to the UE.

In one or more other aspects, apparatus and computer-readable mediums which perform the methods described herein are disclosed.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
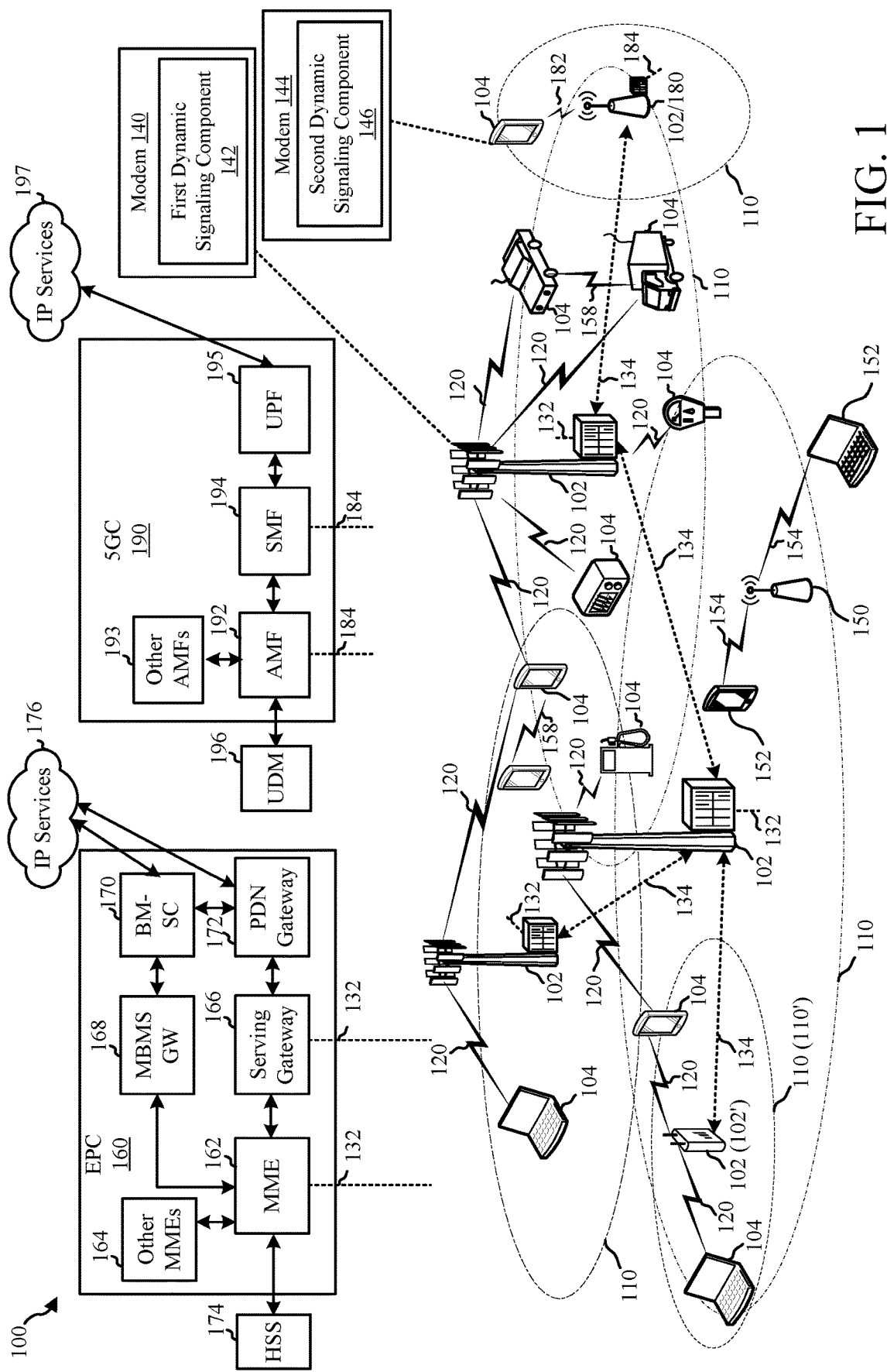
FIG. 1 is a schematic diagram of an example of a wireless communications system and an access network according to aspects of the present disclosure.

The detailed description, set forth below, in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

In conventional systems, a base station may request for N channel state information (CSI) reports from a user equipment (UE) to determine a quality of a channel between the base station and the UE at any given time, where N is the number of CSI reports. The CSI reports may include, for example, channel properties or measurements corresponding to one or more of reference signal receive power (RSRP), signal to noise and interference ratio (SINR), channel quality information (CQI), precoding matrix indicator (PMI), or rank indicator (RI). The UE may require different amounts of CSI processing units to generate each of the N CSI reports, depending on the amount of channel properties and measurements requested by the base station. Further, each of the different channel properties and measurements of the CSI report may have a priority, and depending on UE capabilities (i.e., processing capabilities of the UE), may only report (and/or update) highest priority channel properties and measurements.

In conventional systems, the UE indicates the CSI processing capabilities of the UE to the base station in an initial capabilities report. In this initial report, the UE indicates a maximum number (max $N_{CPU}$) of CSI processing units for processing CSI reports. In an aspect, when a UE supports simultaneous CSI calculations, the UE is said to have $N_{CPU}$ CSI processing units to process CSI reports across all configured cells. In other words, multiple cells may be configured for a UE to support carrier aggregation, each requested CSI report may be associated with a particular cell, and therefore, if the UE provides multiple CSI reports (for multiple cells), the max $N_{P}u$ limit is the actual sum of all reports for all cells.

Further, if L CSI processing units are occupied (or unavailable) at a given orthogonal frequency division multiple (OFDM) symbol, where L is the number of occupied CSI processing units, then the UE has max $N_{CPU}$−L unoccupied (or available) CSI processing units. Depending on the CSI processing units occupancy, the UE may update M of the requested CSI reports, where M is a number less than N, and the UE is typically not required to update N−M requested CSI reports with a low priority, according to:

$$\Sigma_{n=0}^{M} O_{CPU}^{n} \leq \max N_{CPU} - L$$

where, $O_{CPU}^{n}$ is the occupancy of CSI report n. Based on these situations used for CSI reporting, CSI processing is typically highly dependent on the maximum UE capabilities (i.e., maximum number of CSI processing units).

According to aspects of the present disclosure, techniques are provided for dynamically configuring CSI processing units of a UE for processing CSI reports. In other words, the techniques provided herein are not solely dependent on the maximum UE capabilities. Instead, in an aspect, the techniques described herein may be used to dynamically configure a number of CSI processing units used by the UE based on an operational state (e.g., power constraint, battery level, sleep mode, or power mode) of the UE. For example, the UE may signal to the base station a number of CSI processing units ($N_{CPU}$) supported by the UE due to the operation state of the UE. In this example, the UE may signal the $N_{CPU}$ value via a media access control-control element (MAC-CE) or uplink (UL) data. In an example, the $N_{CPU}$ value may be signaled by the UE to the base station using a mode index (e.g., 0=sleep mode, 1=power mode) which indicate a number of CSI processing units that correspond to a respective mode. For example, a first number of CSI processing units may correspond to a first operational state (e.g., sleep mode), and a second number of CSI processing units may correspond to a second operational state (e.g., power mode).

In another aspect, the techniques described herein may be used to dynamically configure CSI processing units based on communication constraints, such as environment constraints or application constraints (e.g., in view of latency or reliability), of the communications. In an example, the base station may sense that communications with the UE may be susceptible to blockages and frequent link disruptions (e.g., unreliable communication environment or application). In this example, the base station may want to signal to the UE to update all CSI reports (e.g., maximum number of CSI reports) using updated measurements from the UE. However, this may be limited by the $N_{CPU}$ value received from the UE indicating the number of supported CSI processing units, as described above. Hence, the base station may directly and dynamically change the cap of the $N_{CPU}$ for the UE (i.e., use a different number of CSI processing units than what was indicated by the UE). For example, the base station may dynamically change the number of CSI processing units to a number greater than the number of CSI processing units supported by the UE based on the operation state of the UE, as long as the new number is less than or equal to the max $N_{CPU}$.

In another example, the base station may sense that communications with the UE are in a relatively stable environment with little interference and the application is not over demanding. In this example, the base station may want to signal to the UE to reduce the number of CSI reports (e.g., any number less than the max $N_{CPU}$) to allow the UE to save power.

In either example, the base station may signal to the UE the new $N_{CPU}$ for the UE to use for calculating and reporting CSI reports. This dynamic signaling may be used to extract up-to-date CSI reports by enabling more processing at the UE. The dynamic signaling by the base station may override currently configured values for the $N_{CPU}$, which may include numbers dynamically signaled by the UE or previously configured through the initial capabilities report from the UE to the base station. In an example, the base station may explicitly signal the new $N_{CPU}$ value or implicitly signal the new $N_{CPU}$ value based on CSI reporting configuration and a property of resources used for measurements for the CSI reporting.

Turning now to the figures, examples of techniques for dynamic configuration of channel state information processing units are depicted. It is to be understood that aspects of the figures may not be drawn to scale and are instead drawn for illustrative purposes.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and a 5G Core (5GC) 190.

The base station 102 may include a modem 140 having a first dynamic signaling component 142 configured to signal to the UE 104 a number of CSI processing units to compute and report CSI reports. For example, the first dynamic signaling component 142 may verify a value indicating a first number of CSI processing units of the UE 104 for calculating and reporting one or more CSI reports, determine communication constraints between the base station 102 and the UE 104, determine a second number of CSI processing units for the UE 104 to use for calculating and reporting the one or more CSI reports based on one or more of the value or the communication constraints, and transmit a notification of the second number of CSI processing units to the UE 104.

The UE 104 may include a modem 144 having a second dynamic signaling component 146 configured to signal to the base station 102 a number of desired CSI processing units to compute and report CSI reports. For example, the second dynamic signaling component 146 may determine an operational state of the UE 104, identify a number of CSI processing units that are supported by the UE 104 for calculating and reporting one or more CSI reports based on the operational state of the UE 104, and transmit, to the base station 102, a notification indicating the number of CSI processing units.

In an aspect, the base stations 102 may include macro cells (high power cellular base station) and/or small cells (low power cellular base station). The macro cells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through backhaul links 132 (e.g., S1 interface). The base stations 102 configured for 5G NR (collectively referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., X2 interface). The backhaul links 134 and 184 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network. A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the 5GC 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, and/or other IP services.

The base station 102 may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device.

Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Figure 2:
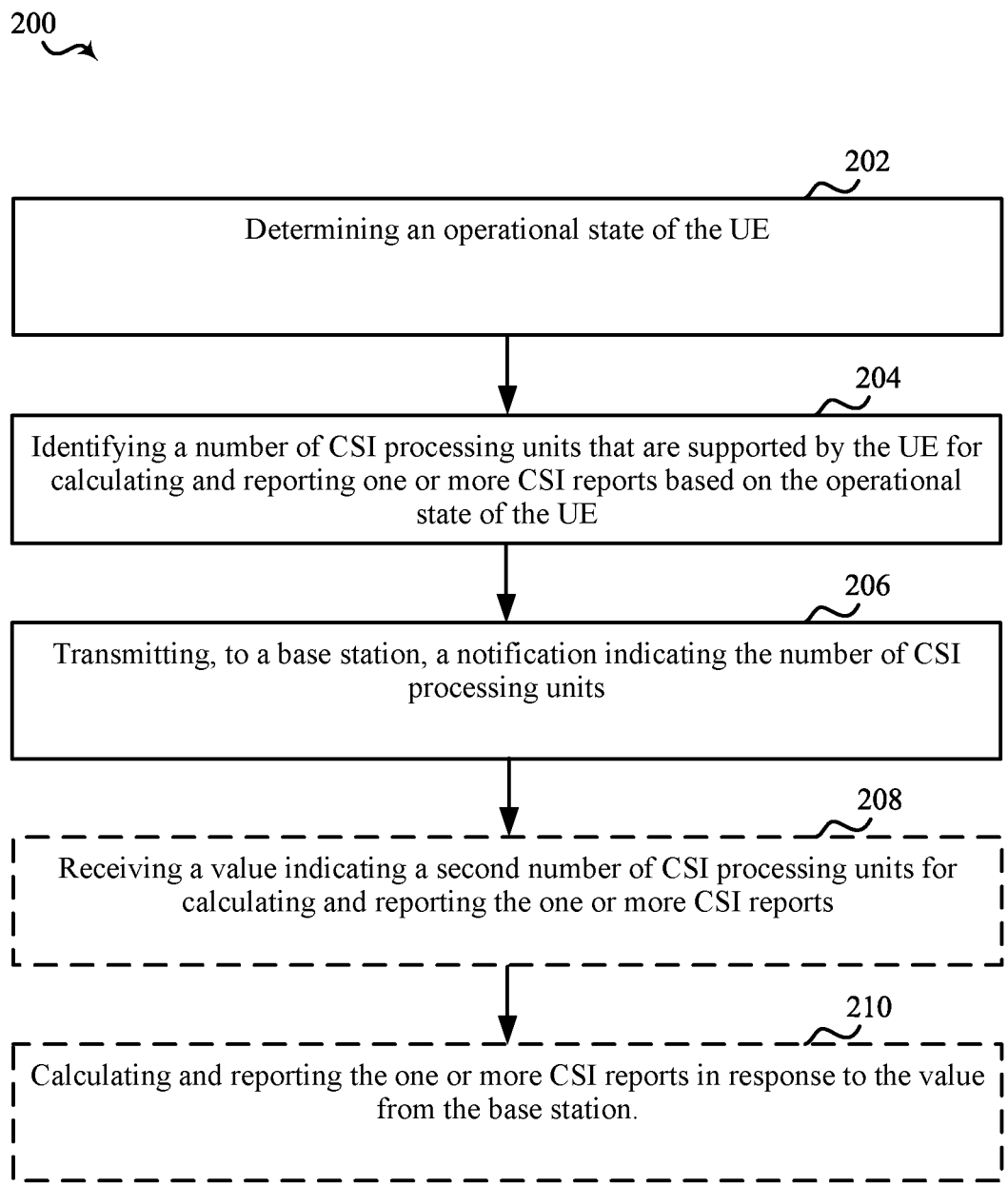
FIG. 2 is a flowchart of an example of a method of wireless communications by a UE, according to aspects of the present disclosure.

Referring to FIG. 2, an example of a method 200 of wireless communication is disclosed. The method 200 may be performed by the UE 104 of FIG. 1 along with any of the components (see e.g., FIG. 3) of the UE 104. For example, the method 200 may be performed by one or more of a processor 312, a transceiver 302, the modem 144, or the second dynamic signaling component 146.

At 202, the method 200 may include determining an operational state of the UE. For example, one or more of the processor 312, the modem 144, or the second dynamic signaling component 146 of the UE 104 may be configured to determine an operational state of the UE 104. Thus, the processor 312, the modem 144, or the second dynamic signaling component 146, one of its subcomponents may define the means for determining an operational state of the UE. In an example, the operational state may be determined based on a reading of a power constraint setting, a battery level, or a sleep/power mode setting of the UE 104.

At 204, the method 200 may include identifying a number of CSI processing units that are supported by the UE for calculating and reporting one or more CSI reports based on the operational state of the UE. For example, one or more of the processor 312, the modem 144, or the second dynamic signaling component 146 of the UE 104 may be configured to identify a number of CSI processing units that are supported by the UE 104 for calculating and reporting one or more CSI reports based on the operational state of the UE 104. Thus, the processor 312, the modem 144, the second dynamic signaling component 146, or one of its subcomponents may define the means for identifying a number of CSI processing units that are supported by the UE 104 for calculating and reporting one or more CSI reports based on the operational state of the UE 104. In an example, one or more of the processor 312, the modem 144, or the second dynamic signaling component 146 of the UE 104 may identify a number of CSI processing units by determining a number of CSI processing units that correspond to a particular operational state of the UE 104. For example, a first number of CSI processing units may correspond to a first operational state (e.g., sleep mode), and a second number of CSI processing units may correspond to a second operational state (e.g., power mode)

At 206, the method 200 may include transmitting, to a base station, a notification indicating the number of CSI processing units. For example, one or more of the processor 312, the transceiver 302, the modem 144, or the second dynamic signaling component 146 of the UE 104 may be configured to transmit, to the base station 102, a notification indicating the number of CSI processing units. Thus, the processor 312, the transceiver 302, the modem 144, the second dynamic signaling component 146, or one of its subcomponents may define the means for transmitting, to a base station, a notification indicating the number of CSI processing units.

At 208, the method 200 may optionally include receiving a value indicating a second number of CSI processing units for calculating and reporting the one or more CSI reports. For example, one or more of the processor 312, the transceiver 302, the modem 144, or the second dynamic signaling component 146 of the UE 104 may be configured to receive a value indicating a second number of CSI processing units for calculating and reporting the one or more CSI reports. Thus, the processor 312, the transceiver 302, the modem 144, the second dynamic signaling component 146, or one of its subcomponents may define the means for receiving a value indicating a second number of CSI processing units for calculating and reporting the one or more CSI reports. In an example, the value may be different from the number indicated in the notification. For example, the value indicating the second number of CSI processing units may correspond to any number greater than the number of CSI processing units indicated in the notification transmitted to the base station 102 but less than or equal to a maximum number of CSI processing units.

At 210, the method 200 may optionally include calculating and reporting the one or more CSI reports in response to the value from the base station. For example, one or more of the processor 312, the transceiver 302, the modem 144, or the second dynamic signaling component 146 of the UE 104 may be configured to calculate and report the one or more CSI reports in response to the value from the base station 102. Thus, the processor 312, the transceiver 302, the modem 144, the second dynamic signaling component 146, or one of its subcomponents may define the means for calculating and reporting the one or more CSI reports in response to the value from the base station.

Figure 3:
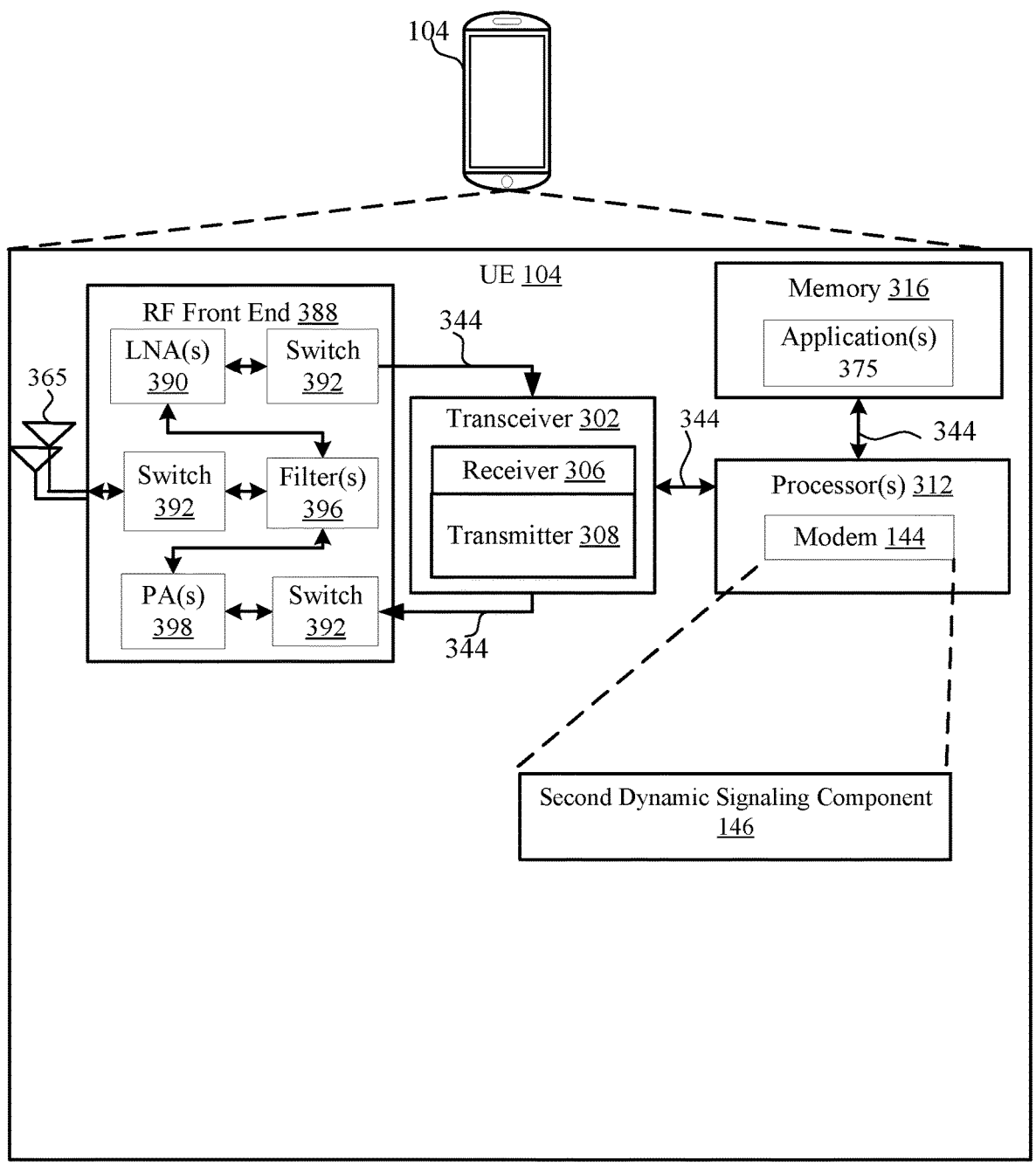
FIG. 3 is a schematic diagram of an example of the UE of FIG. 1, according to aspects of the present disclosure.

Referring to FIG. 3, one example of an implementation of the UE 104 may include a variety of components, some of which have already been described above, but including components such as one or more processors 312, memory 316, and transceiver 302 in communication via one or more buses 344, which may operate in conjunction with a modem 144 to enable one or more of the functions of the method 200 described herein. The one or more processors 312, modem 140, memory 316, the transceiver 302, RF front end 388 and one or more antennas 365, may be configured to support voice and/or data calls (simultaneously or non-simultaneously) in one or more radio access technologies.

In an aspect, the one or more processors 312 may include the modem 144 that uses one or more modem processors. The various functions related to the second dynamic signaling component 146 may be included in the modem 144 and/or the processors 312 and, in an aspect, may be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with the transceiver 302. In other aspects, some of the features of the one or more processors 312 and/or the modem 144 may be performed by the transceiver 302.

Also, the memory 316 may be configured to store data used herein and/or local versions of applications 375 or the second dynamic signaling component 146 and/or one or more of its subcomponents being executed by the at least one processors 312. The memory 316 may include any type of computer-readable medium usable by a computer or the at least one processor 312, such as random access memory (RAM), read only memory (ROM), tapes, magnetic discs, optical discs, volatile memory, non-volatile memory, and any combination thereof. In an aspect, for example, the memory 316 may be a non-transitory computer-readable storage medium that stores one or more computer-executable codes defining the second dynamic signaling component 146 and/or one or more of its subcomponents, and/or data associated therewith, when the UE 104 is operating the at least one processor 312 to execute the second dynamic signaling component 146 and/or one or more of its subcomponents.

The transceiver 302 may include at least one receiver 306 and at least one transmitter 308. The receiver 306 may include hardware, firmware, and/or software code executable by a processor for receiving data, the code comprising instructions and being stored in a memory (e.g., computer-readable medium). The receiver 306 may be, for example, a radio frequency (RF) receiver. In an aspect, the receiver 306 may receive signals transmitted by at least one of the base stations 102. Additionally, the receiver 306 may process such received signals, and also may obtain measurements of the signals, such as, but not limited to, Ec/Io, SNR, RSRP, RSSI, etc. The transmitter 308 may include hardware, firmware, and/or software code executable by a processor for transmitting data, the code comprising instructions and being stored in a memory (e.g., computer-readable medium). A suitable example of the transmitter 308 may include, but is not limited to, an RF transmitter. The transceiver 302, receiver 306, and/or transmitter 308 may be configured to operate in mmW frequencies and/or near mmW frequencies.

Moreover, in an aspect, the UE 104 may include the RF front end 388, which may operate in communication with one or more antennas 365 and the transceiver 302 for receiving and transmitting radio transmissions, for example, wireless communications transmitted by at least one of the base stations 102 or wireless transmissions transmitted by the UE 104. The RF front end 388 may be connected to the one or more antennas 365 and may include one or more low-noise amplifiers (LNAs) 390, one or more switches 392, one or more power amplifiers (PAs) 398, and one or more filters 396 for transmitting and receiving RF signals.

In an aspect, the LNA 390 may amplify a received signal at a desired output level. In an aspect, each of the LNAs 390 may have a specified minimum and maximum gain values. In an aspect, the RF front end 388 may use the one or more switches 392 to select a particular LNA 390 and its specified gain value based on a desired gain value for a particular application.

The one or more PA(s) 398 may be used by the RF front end 388 to amplify a signal for an RF output at a desired output power level. In an aspect, each of the PAs 398 may have specified minimum and maximum gain values. In an aspect, the RF front end 388 may use the one or more switches 392 to select a particular PA 398 and its specified gain value based on a desired gain value for a particular application.

Also, for example, the one or more filters 396 may be used by the RF front end 388 to filter a received signal to obtain an input RF signal. Similarly, in an aspect, for example, a respective filter 396 may be used to filter an output from a respective PA 398 to produce an output signal for transmission. In an aspect, each of the filters 396 may be connected to a specific LNA 390 and/or PA 398. In an aspect, the RF front end 388 may use the one or more switches 392 to select a transmit or receive path using a specified filter 396, LNA 390, and/or PA 398, based on a configuration as specified by the transceiver 302 and/or the processor 312.

As such, the transceiver 302 may be configured to transmit and receive wireless signals through the one or more antennas 365 via the RF front end 388. In an aspect, the transceiver 302 may be tuned to operate at specified frequencies such that the UE 104 may communicate with, for example, one or more of the base stations 102 or one or more cells associated with one or more of the base stations 102. In an aspect, for example, the modem 144 may configure the transceiver 302 to operate at a specified frequency and power level based on the UE configuration of the UE 104 and the communication protocol used by the modem 144.

In an aspect, the modem 144 may be a multiband-multimode modem, which may process digital data and communicate with the transceiver 302 such that the digital data is sent and received using the transceiver 302. In an aspect, the modem 144 may be multiband and be configured to support multiple frequency bands for a specific communications protocol. In an aspect, the modem 144 may be multimode and be configured to support multiple operating networks and communications protocols. In an aspect, the modem 144 may control one or more components of the UE 104 (e.g., RF front end 388, transceiver 302) to enable transmission and/or reception of signals from the network based on a specified modem configuration. In an aspect, the modem configuration may be based on the mode of the modem 144 and the frequency band in use. In another aspect, the modem configuration may be based on UE configuration information associated with the UE 104 as provided by the network during cell selection and/or cell reselection.

Figure 4:
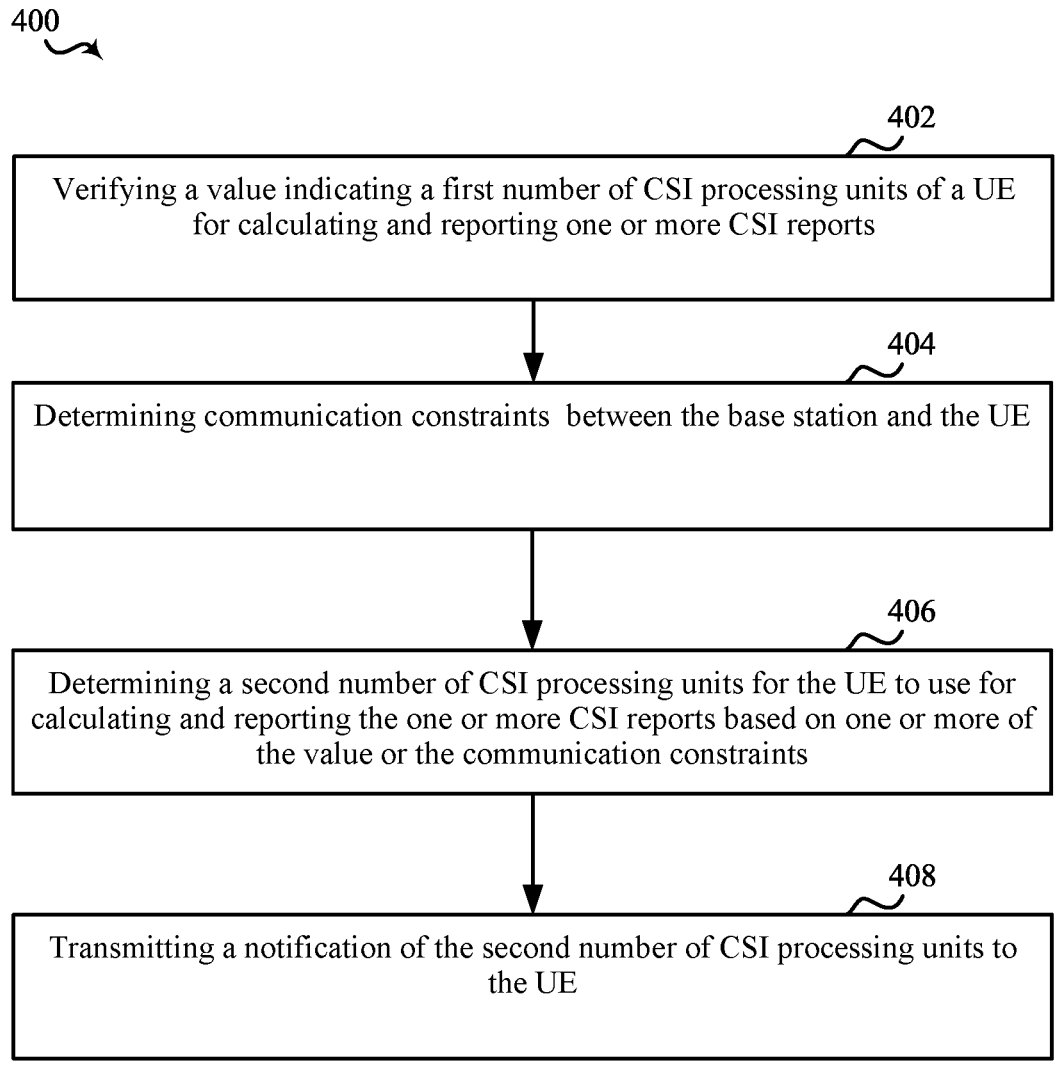
FIG. 4 is a flowchart of an example of a method of wireless communications by a base station, according to aspects of the present disclosure.

Referring to FIG. 4, an example of a method 400 of wireless communications is disclosed. The method 400 may be performed by the base station 102 of FIG. 1 along with any of the components (see e.g., FIG. 5) of the base station 102. For example, the method 400 may be performed by one or more of the a processor 512, a transceiver 502, the modem 140, or the first dynamic signaling component 142.

At 402, the method 400 may include verifying a value indicating a first number of CSI processing units of a UE for calculating and reporting one or more CSI reports. For example, one or more of the processor 512, the modem 140, or the first dynamic signaling component 142 may be configured to verify a value indicating a first number of CSI processing units of a UE 104 for calculating and reporting one or more CSI reports. Thus, the processor 512, the modem 140, the first dynamic signaling component 142, or one of its subcomponents may define the means for verifying a value indicating a first number of CSI processing units of a UE 104 for calculating and reporting one or more CSI reports. In an example, the value indicating the number of CSI processing units may correspond to a maximum number of CSI processing units indicated in an initial capabilities report from the UE or correspond to number of CSI processing units supported by the UE based on an operational state of the UE indicated in a dynamic notification from the UE.

At 404, the method 400 may include determining communication constraints between the base station and the UE. For example, one or more of the processor 512, the modem 140, or the first dynamic signaling component 142 may determine communication constraints between the base station 102 and the UE 104 based on one or more of latency or reliability of communications between the base station 102 and the UE 104. Thus, the processor 512, the modem 140, the first dynamic signaling component 142, or one of its subcomponents may define the means for determining communication constraints between the base station 102 and the UE 104.

At 406, the method 400 may also include determining a second number of CSI processing units for the UE to use for calculating and reporting the one or more CSI reports based on one or more of the value or the communication constraints. For example, one or more of the processor 512, the modem 140, or the first dynamic signaling component 142 may be configured to determine a second number of CSI processing units for the UE 104 to use for calculating and reporting the one or more CSI reports based on one or more of the value or the communication constraints. Thus, the processor 512, the modem 140, the first dynamic signaling component 142, or one of its subcomponents may define the means for determining a second number of CSI processing units for the UE to use for calculating and reporting the one or more CSI reports based on one or more of the value or the communication constraints. For example, the base station 102 may determine to use a second number of CSI processing units that is less than the first number of CSI processing units (e.g., maximum number of CSI processing units) when communication constraints indicate reliable communications with the UE. In another example, the base station may determine to use a second number of CSI processing units that is greater than the first number of CSI processing units (e.g., number of CSI processing units supported by UE due to operational state of UE) when communication constraints indicate unreliable communications with the UE.

At 408, the method 400 may also include transmitting a notification of the second number of CSI processing units to the UE. For example, one or more of the processor 512, the transceiver 502, the modem 140, or the first dynamic signaling component 142 may be configured to transmit a notification of the second number of CSI processing units to the UE 104. Thus, the processor 512, the transceiver 502, the modem 140, the first dynamic signaling component 142, or one of its subcomponents may define the means for transmitting a notification of the second number of CSI processing units to the UE.

Figure 5:
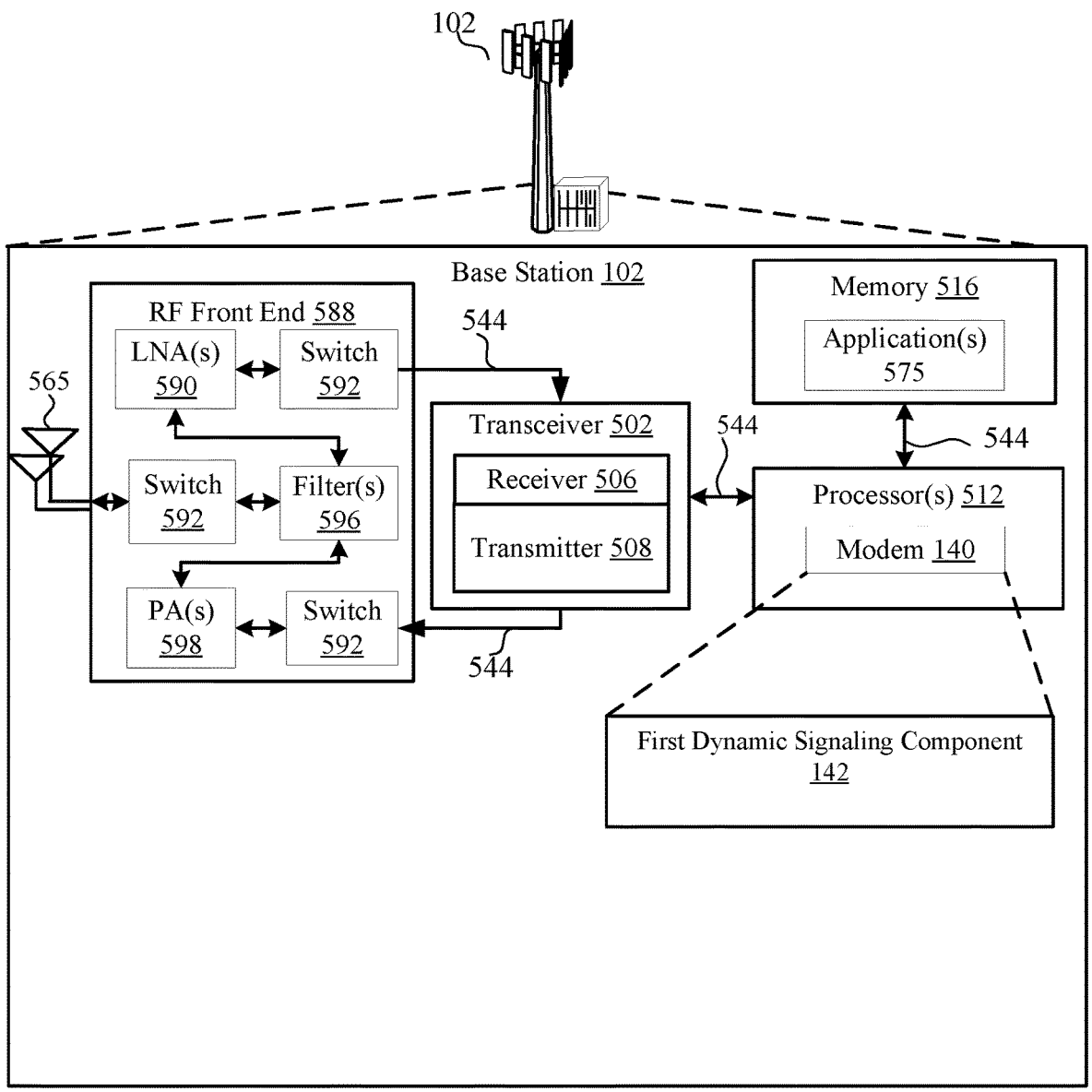
FIG. 5 is a schematic diagram of an example of the base station of FIG. 1, according to aspects of the present disclosure.

Referring to FIG. 5, one example of an implementation of base station 102 may include a variety of components, some of which have already been described above, but including components such as one or more processors 512, memory 516 and transceiver 502 in communication via one or more buses 544, which may operate in conjunction with modem 140 and the second dynamic signaling component 142 to enable one or more of the functions of the method 400 described herein.

The transceiver 502, receiver 506, transmitter 508, one or more processors 512, memory 516, applications 575, buses 544, RF front end 588, LNAs 590, switches 592, filters 596, PAs 598, and one or more antennas 565 may be the same as or similar to the corresponding components of the UE 104, as described above, but configured or otherwise programmed for base station operations as opposed to UE operations.

Some Further Example Embodiments

An example method of wireless communication by a user equipment (UE), comprising: determining an operational state of the UE; identifying a number of channel state information (CSI) processing units that are supported by the UE for calculating and reporting one or more CSI reports based on the operational state of the UE; and transmitting, to a base station, a notification indicating the number of CSI processing units.

The above example method, wherein the operational state of the UE is one or more of a power constraint, a battery level, a sleep mode, or a power mode corresponding to the UE.

One or more of the above example methods, wherein the number of CSI processing units is less than a maximum number of available CSI processing units.

One or more of the above example methods, wherein the notification includes an index value to indicate the number of CSI processing units.

One or more of the above example methods, wherein the notification is signaled in one of a media access control-control element (MAC-CE) or uplink (UL) data.

One or more of the above example methods, further comprising: receiving a request for a CSI report in response to the notification.

One or more of the above example methods, further comprising: receiving a value indicating a second number of CSI processing units for calculating and reporting the one or more CSI reports; and calculating and reporting the one or more CSI reports in response to the value from the base station.

An example apparatus for wireless communication, comprising: a memory storing instructions; and at least one processor communicatively coupled to the memory and configured to perform any of the above example methods.

An example computer-readable medium storing computer executable code, comprising code to: perform any of the above example methods.

Another example apparatus, comprising: means for performing any of the above example methods.

An example second method of wireless communication by a base station, comprising: verifying a value indicating a first number of channel state information (CSI) processing units of a user equipment (UE) for calculating and reporting one or more CSI reports; determining communication constraints between the base station and the UE; determining a second number of CSI processing units for the UE to use for calculating and reporting the one or more CSI reports based on one or more of the value or the communication constraints; and transmitting a notification of the second number of CSI processing units to the UE.

The above second example method, further comprising: receiving the value indicating the first number of CSI processing units from the UE.

One or more of the above second example methods, wherein the first number of CSI processing units is less than a maximum number of available CSI processing units.

One or more of the above second example methods, wherein first number of CSI processing units is equal to a maximum number of available CSI processing units.

One or more of the above second example methods, wherein the communication constraints correspond to one or more of latency or reliability of communications between the base station and the UE.

One or more of the above second example methods, wherein the value is an index value corresponding to first number of CSI processing units.

One or more of the above second example methods, wherein the first number of CSI processing units corresponds to a number of CSI processing units that are supported by the UE based on an operational state of the UE, and wherein the operational state is one or more of a power constraint, a battery level, a sleep mode, or a power mode corresponding to the UE.

An example apparatus for wireless communication, comprising: a memory storing instructions; and at least one processor communicatively coupled to the memory and configured to perform any of the above second example methods.

An example computer-readable medium storing computer executable code, comprising code to: perform any of the above second example methods.

Another example apparatus, comprising: means for performing any of the above example second methods.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially-programmed device, such as but not limited to a processor, a digital signal processor (DSP), an ASIC, a FPGA or other programmable logic device, a discrete gate or transistor logic, a discrete hardware component, or any combination thereof designed to perform the functions described herein. A specially-programmed processor may be a microprocessor, but in the alternative, the processor may be any conventional processor, controller, microcontroller, or state machine. A specially-programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above may be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that may be accessed by a general purpose or special purpose computer. By way of example, and not limitation, computer-readable media may comprise RAM, ROM, EEPROM, CD-ROM or other optical disk storage, magnetic disk storage or other magnetic storage devices, or any other medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. A method of wireless communication by a user equipment (UE), comprising:
   determining an operational state of the UE;
   identifying a number of channel state information (CSI) processing units that are supported by the UE for calculating and reporting one or more CSI reports based on the operational state of the UE; and
   transmitting, to a base station, a notification including an index value indicating the determined operational state where the operational state has an associated number of CSI processing units.

2. The method of claim 1, wherein the operational state of the UE is one or more of a power constraint, a battery level, a sleep mode, or a power mode corresponding to the UE.

3. The method of claim 1, wherein the number of CSI processing units is less than a maximum number of available CSI processing units.

4. The method of claim 1, wherein the notification is signaled in one of a media access control-control element (MAC-CE) or uplink (UL) data.

5. The method of claim 1, further comprising:
   receiving a request for a CSI report in response to the notification.

6. The method of claim 1, further comprising:
   receiving a value indicating a second number of CSI processing units for calculating and reporting the one or more CSI reports; and calculating and reporting the one or more CSI reports in response to the value from the base station.

7. A method of wireless communication by a base station, comprising:
   verifying a value indicating a first number of channel state information (CSI) processing units of a user equipment (UE) for calculating and reporting one or more CSI reports;
   determining communication constraints between the base station and the UE;
   determining a second number of CSI processing units for the UE to use for calculating and reporting the one or more CSI reports based on one or more of the value or the communication constraints, wherein the second number of CSI processing units for the UE is greater than a number of the one or more CSI reports; and
   transmitting a notification of the second number of CSI processing units to the UE.

8. The method of claim 7, further comprising:
   receiving the value indicating the first number of CSI processing units from the UE.

9. The method of claim 8, wherein the first number of CSI processing units is less than a maximum number of available CSI processing units.

10. The method of claim 8, wherein first number of CSI processing units is equal to a maximum number of available CSI processing units.

11. The method of claim 7, wherein the communication constraints correspond to one or more of latency or reliability of communications between the base station and the UE.

12. The method of claim 7, wherein the value is an index value corresponding to first number of CSI processing units.

13. The method of claim 7, further comprising receiving the value indicating the first number of CSI processing units from the UE, wherein the value is the index value indicating an operational state of the UE with the operational state having an associated first number of CSI processing units, and wherein the operational state is one or more of a power constraint, a battery level, a sleep mode, or a power mode corresponding to the UE.

14. A user equipment (UE), comprising:
   a memory storing instructions; and
   one or more processors communicatively coupled with the memory and configured to:
      determine an operational state of the UE;
      identify a number of channel state information (CSI) processing units that are supported by the UE for calculating and reporting one or more CSI reports based on the operational state of the UE; and
      transmit, to a base station, a notification including an index value indicating the determined operational state where the operational state has an associated number of CSI processing units.

15. The UE of claim 14, wherein the operational state of the UE is one or more of a power constraint, a battery level, a sleep mode, or a power mode corresponding to the UE.

16. The UE of claim 14, wherein the number of CSI processing units is less than a maximum number of available CSI processing units.

17. The UE of claim 14, wherein the notification is signaled in one of a media access control-control element (MAC-CE) or uplink (UL) data.

18. The UE of claim 14, wherein the one or more processors is further configured to:
   receive a request for a CSI report in response to the notification.

19. The UE of claim 14, wherein the one or more processors is further configured to:
   receive a value indicating a second number of CSI processing units for calculating and reporting the one or more CSI reports; and
   calculate and report the one or more CSI reports in response to the value from the base station.

20. A base station, comprising:
   a memory storing instructions; and
   one or more processors communicatively coupled with the memory and configured to:
      verify a value indicating a first number of channel state information (CSI) processing units of a user equipment (UE) for calculating and reporting one or more CSI reports;
      determine communication constraints between the base station and the UE;
      determine a second number of CSI processing units for the UE to use for calculating and reporting the one or more CSI reports based on one or more of the value or the communication constraints, wherein the second number of CSI processing units for the UE is greater than a number of the one or more CSI reports; and
      transmit a notification of the second number of CSI processing units to the UE.

21. The base station of claim 20, wherein the one or more processors is further configured to:
   receive the value indicating the first number of CSI processing units from the UE.

22. The base station of claim 21, wherein the first number of CSI processing units is less than a maximum number of available CSI processing units.

23. The base station of claim 21, wherein first number of CSI processing units is equal to a maximum number of available CSI processing units.

24. The base station of claim 20, wherein the communication constraints correspond to one or more of latency or reliability of communications between the base station and the UE.

25. The base station of claim 20, wherein the value is an index value corresponding to first number of CSI processing units.

26. The base station of claim 20, wherein the one or more processors is further configured to receive the value indicating the first number of CSI processing units from the UE, wherein the value is the index value indicating an operational state of the UE with the operational state having an associated first number of CSI processing units, and wherein the operational state is one or more of a power constraint, a battery level, a sleep mode, or a power mode corresponding to the UE.

* * * * *